United States Patent
Patterson

[15] 3,643,212
[45] Feb. 15, 1972

[54] METHOD AND APPARATUS FOR DUAL LOCATION SONAR MEASUREMENT OF CAVERNS

[72] Inventor: Gerald D. Patterson, Tulsa, Okla.
[73] Assignee: The Dow Chemical Company, Midland, Mich.
[22] Filed: Jan. 5, 1970
[21] Appl. No.: 734

[52] U.S. Cl. ................. 340/3 R, 181/0.5 BE, 181/0.5 NP
[51] Int. Cl. ................................................. G01s 9/66
[58] Field of Search ............ 340/1, 3, 18; 181/0.5 BE, 0.5 NP

[56] References Cited

UNITED STATES PATENTS 2,631,270  3/1953  Goble ........................................ 340/1

Primary Examiner—Richard A. Farley
Attorney—Griswold and Burdick and Earl D. Ayers

[57] ABSTRACT

This invention relates to methods and apparatus for surveying caverns. More particularly the invention relates to methods and apparatus for surveying an underground cavern penetrated by spaced-apart boreholes including positioning a sound-transmitting device into one borehole and a sound-receiving device in the second borehole, transmitting sequential sound pulses by the transmitting device, reflecting the sound pulses from the cavern wall, receiving the sound pulses at the receiving device, and measuring the elapsed time between the transmission and receipt of sound pulses.

6 Claims, 4 Drawing Figures

INVENTOR.
GERALD D. PATTERSON
BY
Griswold & Burdick
ATTORNEYS

INVENTOR.
GERALD D. PATTERSON
BY
Griswold & Burdick
ATTORNEYS 3,643,212

METHOD AND APPARATUS FOR DUAL LOCATION SONAR MEASUREMENT OF CAVERNS

CROSS REFERENCE

This application is not related to any pending United States or foreign patent application.

BACKGROUND AND SUMMARY OF THE INVENTION

In the solution mining industry a problem frequently encountered is that of readily ascertaining the configuration of the cavern being formed. Since solution mining is typically carried out by means of boreholes extending from the earth's surface, surveys must be conducted by instruments lowered into the cavern through such boreholes. Surveying methods utilizing sonar have proven to be the most successful. Reference may be had to U.S. Pat. No. 3,436,720, filed Oct. 10, 1966, entitled "Sonar Apparatus For Measuring Underground Caverns," Gerald D. Patterson, Inventor, for information relating to this subject. Sonar surveys of caverns conducted up to this time have been undertaken by lowering instruments into a single borehole penetrating the cavern with sound signals being sent and received from such instruments. This procedure is satisfactory if the cavern is of a configuration such that the borehole through which the survey is conducted is fairly well centered in the cavern. In many instances, however, this is not the case.

In solution mining one technique employs boreholes penetrating the stratum being mined, one of the boreholes serving as an inlet well in which dilute solution is introduced and the other serving as an outlet well at which concentrated solution is withdrawn. When two or more spaced boreholes are utilized to extract minerals from a subterranean formation the cavern formed tends to be elongated. In such case a sonar survey attempted at either the inlet or outlet borehole produces results not always as complete and accurate as desirable. This invention provides a method of conducting a survey of a cavern utilizing spaced-apart boreholes.

It is therefore an object of this invention to provide a method of surveying underground caverns.

More particularly, objects of this invention include providing methods and apparatus for surveying, by sonar means, an underground cavern having communication with the earth through two spaced-apart boreholes.

These general objects, as well as more specific objects of the invention will be understood by references to the description and claims, taken in conjunction with the drawings.

DESCRIPTION OF THE VIEWS

DETAILED DESCRIPTION

This invention utilizes apparatus and methods for conducting sonar surveys of caverns penetrated by two boreholes spaced from each other. Generally speaking the method includes lowering a directional sound transmitting device into one of the boreholes and lowering a nondirectional sound receiving device into the second borehole, the sound transmitting and receiving devices being connected to an elapsed time indicator device positioned on the earth's surface. Sound is then sequentially transmitted from the directional transmitting device and the echoes from the cavern walls are received by the sound-receiving device. The elapsed time between the transmission and receipt of sound pulses is utilized for trigonometric calculations of the wall distance from the transmitting device.

Figure 1:
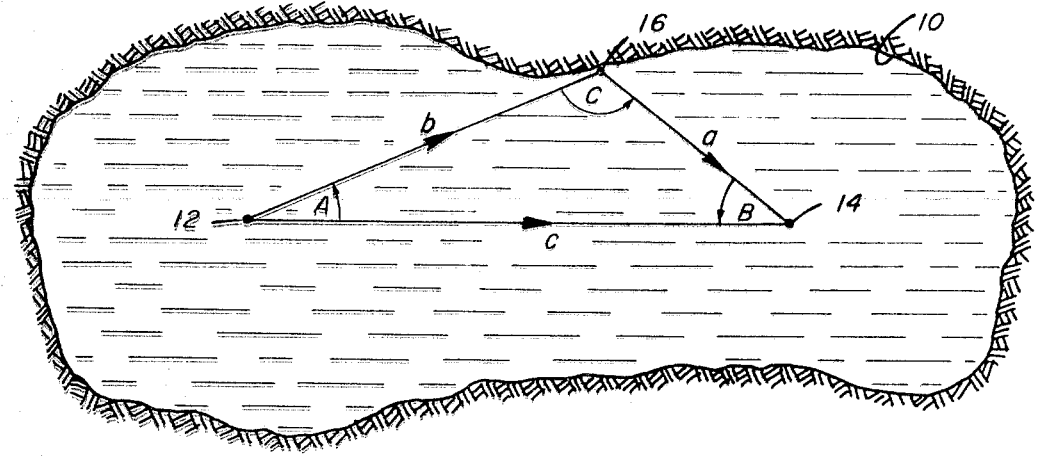
FIG. 1 is a diagrammatic view showing the cross-sectional outline of a cavern penetrated by two spaced-apart boreholes showing geometrical relationships of sound waves traveling through the cavern fluid as occurs in practicing the method of this invention.

Referring to FIG. 1 a cavern 10 is shown in horizontal cross section. A sound-transmitting device 12 lowered into the cavern through a borehole is positioned at one point in the cavern and a sound-receiving device 14 lowered into the cavern through a different borehole is positioned at another point in the cavern. The sound transmitting and receiving devices are preferably maintained at the same elevation and raised or lowered in unison. The azimuth direction of propagation of sound from transmitting device 12 may be controlled as in conventional sonar surveying instruments. When the sound transmitter 12 is aimed directly at the receiver 14 a strong signal is received along path $c$. This strong signal may be utilized to identify the receiver and at the same time determine its azimuth bearing with respect to the transmitter. The use of magnetic compass or other means in conjunction with the sound-transmitting device at 12 by practices well known in the petroleum industry for determining azimuth relationships would also be within the scope of the invention. From the time lapse for a sound pulse to travel between transmitting device 12 and receiving device 14 the distance $c$ is determined.

When the transmitter is rotated so as to direct the sound along path $b$ the sound is reflected from the wall of cavern 10 at point 16. The reflected sound travels along the path $a$ to the sound receiver 14. The angle A is easily established utilizing tool compass devices well known in the petroleum industry. The distance $c$ is known from prior computation as indicated above. By the time lapse required for the sound to travel from transmitter 12, be reflected from the cavern wall at point 16, and reach the receiver 14, the total distance $b+a$ may be determined. The distance $b$ may then be computed from the following relationship:

$$b = \frac{S(S-c)}{C\sin^2\frac{A}{2} + (S-c)} = \text{Distance to cavity wall}$$

where S equals ½ $(a+b+c)$. This relationship is derived as follows:

$$\sin^2\frac{A}{2} = \frac{(S-b)(S-c)}{bc} = \frac{S^2 - Sc - Sb + cb}{bc}$$

$$bc\sin^2\frac{A}{2} = S(S-c) - b(S-c)$$

$$bc\sin^2\frac{A}{2} + b(S-c) = S(S-c)$$

$$b(c\sin^2\frac{A}{2} + S - c) = S(S-c)$$

$$b = \frac{S(S-c)}{c\sin^2\frac{A}{2} + (S-c)} = \text{Distance to cavity wall}$$

Thus, by the application of the formula set forth above for each transmitting direction at which angle A is known and the distances $c$ and $b+a$ are calculated by elapsed time measurements the distance between the transmitter 12 and the point of reflection 16 can be easily calculated.

Figure 2:
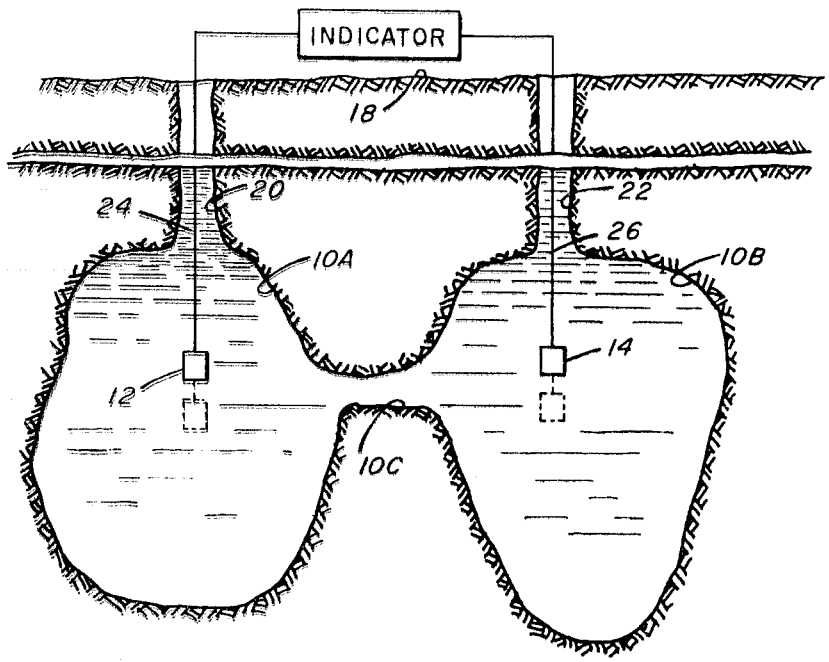
FIG. 2 is a vertical cross-sectional view of a cavern penetrated by two spaced-apart boreholes showing means of surveying the caverns by simultaneous vertical movement of apparatus positioned in the caverns through each of the boreholes to determine the geometrical characteristics of the portion of the cavern between the boreholes.

Another use of the method and apparatus of this invention is the determination of the configuration of passageways between two underground caverns each penetrated by a borehole. This is illustrated best in FIG. 2. In this instance the underground cavern may be said to include two portions, that is, 10A having communications with the earth's surface 18 by means of borehole 20 and portion 10B having communication by way of borehole 22. Between the cavern portions 10A and 10B is a reduced vertical height portion or passageway 10C. A sound transmitting device 12, lowered into cavern portion 10A by means of cable 24, is raised and lowered in the cavern 10A in unison with the raising and lowering of sound receiver 14 suspended on cable 26. When the sound sender and receiver sources 12 and 14 respectively are above the top of passageway 10C sound waves are impeded from passing from one cavern portion to the other. The same applies when the sender and receiver are below the passageway 10C. Thus, the height of the passageway 10C may be indicated by gradually lowering or raising the sender 12 and receiver 14 in unison, noting the elevations at which sound communication between the two begins and ends.

It can be seen that once the top and bottom elevations of passageway 10C are determined the transmitter and receiver devices 12 and 14 may be positioned at an intermediate height. By determining the angle of displacement of the transmitter 12 between the beginning and the termination of the signals passing through passageway 10C as the transmitter 12 is rotated the width of the passageway may be calculated. Thus, by the spaced-apart or double sonar apparatus of this invention a method is provided for determining both the height and width of passageway 10C.

Figure 3:
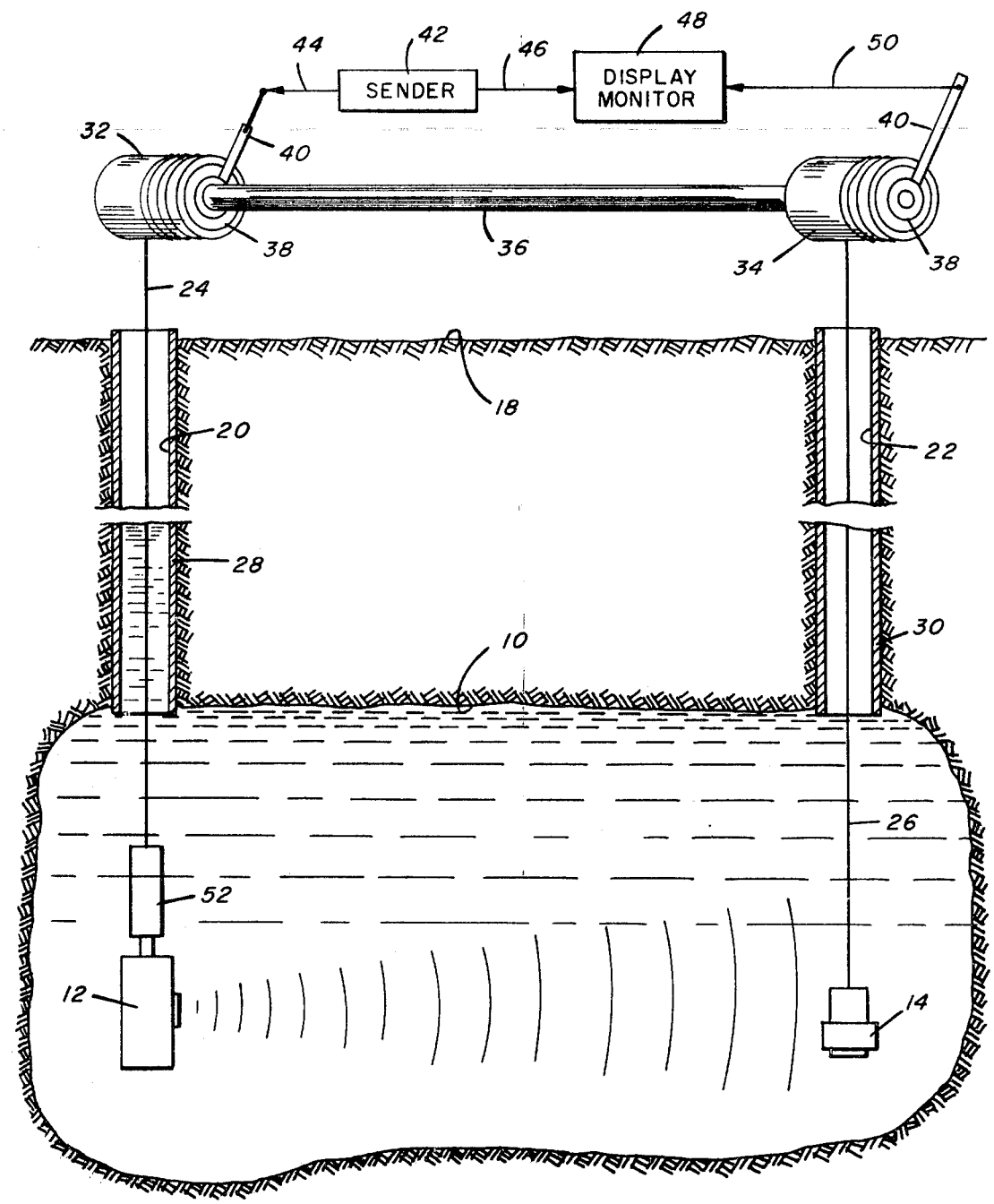
FIG. 3 is a diagrammatic representation of means of practicing the method of this invention to indicate at various elevations the configuration of a cavern penetrated by two spaced-apart boreholes.

FIG. 3 shows apparatus which may be used to conduct a dual sonar survey of a cavern 10. First borehole 20 has casing 28 therein and second borehole 22 receives casing 30. Transmitting instrument 12 is suspended on cable 24 which, at the earth's surface, is wound on a drum 32. In like manner, receiver 14 is suspended in second borehole 22 by a cable 26 which is wound on a drum 34. Drums 32 and 34 are connected for simultaneous rotation by shaft 36.

Each of the drums 32 and 34 includes a slipring 38 and a brush 40 by which contact is made with cables 24 and 26. A sender apparatus 42 transmits sequential electrical pulses which are coupled by conductor 44, brush 40, slipring 38 and cable 24 to the sound transmitter 12 whereby sequential bursts of sound energy are transmitted in the cavern fluid. Each time an electrical pulse is transmitted by sender 42 to transmitter 12 a keying signal is sent by conductor 46 to a display monitor instrument 48. When a sound pulse is received at receiver 14 an electrical signal resulting therefrom is conducted by cable 26, slipring 38, brush 40 and conductor 50 to display monitor 48. It is the function of display monitor 48 to measure the time lapse from the sending of an electrical pulse by sender 42 to the receipt of a signal from receiver 14, as an indication of the time of travel of the sound pulse in the cavern fluid, and to indicate such elapsed time.

A motor 52 positioned between the lower end of cable 24 and transmitter 12 may be utilized for the azimuth rotation of transmitter 12. Reference may be had to the previously mentioned U.S. patent application Ser. No. 583,353, for more detailed description of the function and operation of apparatus of the type represented by sender 42 and display monitor 48.

FIG. 3 shows the relationship in which sound is transmitted directly from transmitter 12 to receiver 14. As shown in FIG. 1 the azimuth rotation of the transmitter 12 results in sound pulses being reflected from the cavern wall and by means of the relationship previously set forth, the configuration of the cavern wall in horizontal planes may be established. By positioning the transmitter 12 and receiver 14 in unison at various elevations the total geometrical configuration of the cavern may be determined.

In another arrangement and as a matter of convenience, means may be provided with transmitter 12 for receiving sound pulses, including means of conveying the electrical signals created by such received sound pulses to display monitor 48. In this way the transmitter 12 may be utilized as a combined sender-receiver and a geometrical survey may be made utilizing the instrument 12 alone without the necessity of bringing the apparatus out of the well. Thus the apparatus of FIG. 3 may be employed, by the methods of this invention, to provide a single sonar configuration survey or a double sonar configuration survey.

Figure 4:
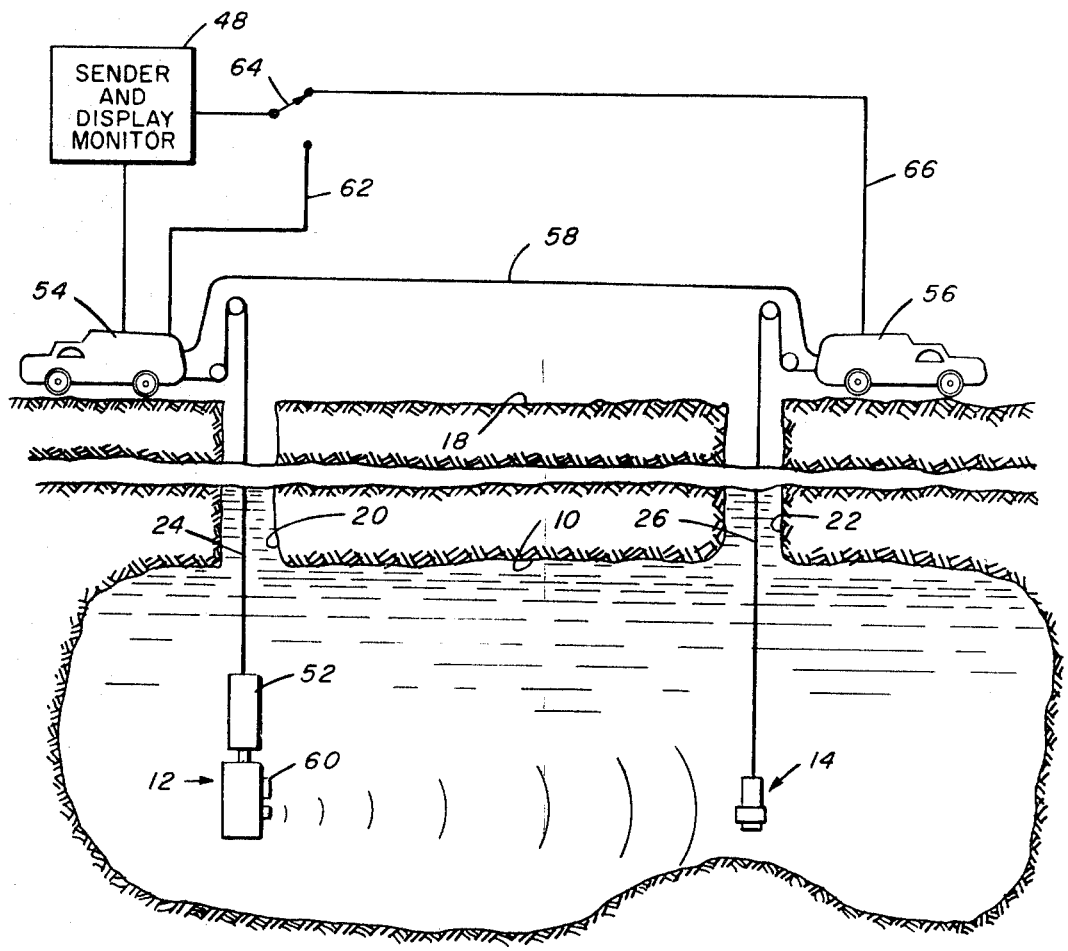
FIG. 4 is a diagrammatic view showing, in vertical cross section, an underground cavern penetrated by spaced-apart boreholes and showing apparatus located upon the surface of the earth for conducting surveys of the cavern.

Referring to FIG. 4 another illustration of apparatus which may typically be utilized to practice the invention is shown, such apparatus being more exemplary of a large cavern in which the boreholes communicating with the cavern are spaced further apart. In this arrangement trucks 54 and 56 are utilized to house the equipment. A communications link 58 extends between trucks 54 and 56 for providing unison variation in the elevation of the sound transmitter and receiver elements.

In FIG. 4 the sound transmitter 12 is shown including a receiver portion 60 which provides electrical indication of received sound signals on conductor 62. When switch 64 is in the down position sound is transmitted and received at station 12 so that a single sonar survey of the cavern 10 may be provided as previously described. With switch 64 in the up position the sound pulses are received at receiver element 14 and conveyed by way of electrical signals conductor 66 to the display monitor 48.

The invention has been described with a certain degree of particularity and it is manifest that many changes may be made in the details of construction, the arrangement of components, and the steps of practicing methods without departing from the spirit and the scope of the invention.

What is claimed:

1. A method of surveying an underground cavern penetrated by a first and second spaced-apart borehole comprising:
   lowering a directional sound-transmitting device by means of a cable into the first borehole;
   lowering a sound-receiving device by means of a cable into the second borehole, said sound-transmitting device and said sound-receiving device being connected to an elapsed time indicator positioned on the earth's surface;
   transmitting sequential sound pulses by way of said directional sound-transmitting device;
   receiving the sequential sound pulses by said sound-receiving device directly and as reflected from the cavern walls; and
   indicating the elapsed time between the transmission and receipt of sound pulses on said indicator.

2. A method of surveying an underground cavern according to claim 1 including rotating said directional sound-transmitting device.

3. A method of surveying an underground cavern according to claim 1 including simultaneously elevationally positioning said sound-transmitting device and said sound-receiving device.

4. Apparatus for surveying an underground cavern penetrated by a first and second spaced apart borehole extending from the earth's surface, comprising:
   a directional sound pulse transmitting means positioned in the cavern by way of the first borehole;
   a sound receiving means positioned in the cavern by way of the second borehole, the sound receiving means receiving sound pulses transmitted by said sound transmitting means directly and as reflected from the cavern walls; and
   an elapsed time indicator means at the earth's surface having connection to said transmitting means and said receiving means.

5. Apparatus for surveying an underground cavern according to claim 4 including means of simultaneously elevationally positioning said sound transmitting and receiving means.

6. Apparatus for surveying an underground cavern according to claim 4 including means of rotating said directional sound pulse transmitting means.

* * * * *